United States Patent

[11] 3,579,128

| [72] | Inventors | Ervin Smith |
| | | Timonium; |
| | | John O. Wedel, Baltimore, Md. |
| [21] | Appl. No. | 798,658 |
| [22] | Filed | Feb. 12, 1969 |
| [45] | Patented | May 18, 1971 |
| [73] | Assignee | The United States of America as represented by the Secretary of the Navy |

[54] PHASE CONTROLLER
5 Claims, 3 Drawing Figs.

| [52] | U.S. Cl. | 328/155, 328/44, 328/134 |
| [51] | Int. Cl. | H03b 3/04 |
| [50] | Field of Search | 328/134, 155, 411 |

[56] References Cited
UNITED STATES PATENTS

| 3,271,688 | 9/1966 | Gschwind et al. | 328/155X |
| 3,404,230 | 10/1968 | Hailey et al. | 328/134X |
| 3,436,647 | 4/1969 | Gobeli et al. | 328/155X |

Primary Examiner—John S. Heyman
Attorneys—E. J. Brower, A. W. Collins and S. J. Bor ABSTRACT: The subject disclosure relates to novel and improved apparatus for detecting and nulling the difference in phase between a pair of electrical operational channels. The apparatus includes a signal generator which applies a test signal to each operational channel, a phase detector coupled to the output of the channels, an analog to digital converter that converts the detected phase difference into a count in and up and down counter circuit and switching devices that in response to the output of the counter couple phase shift elements into one of the channels so as to equalize the phase between the two channels.

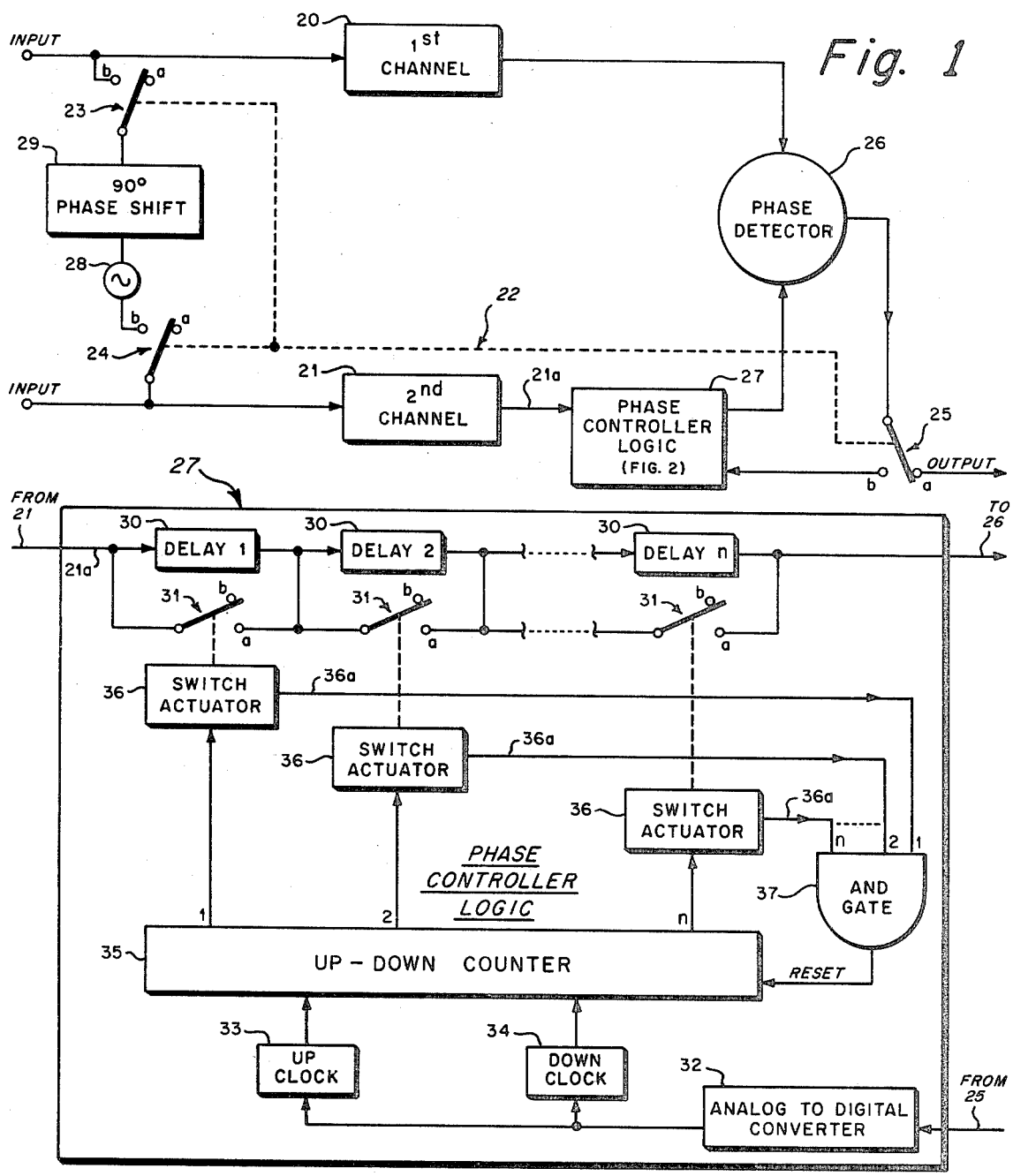
Fig. 1
Fig. 2
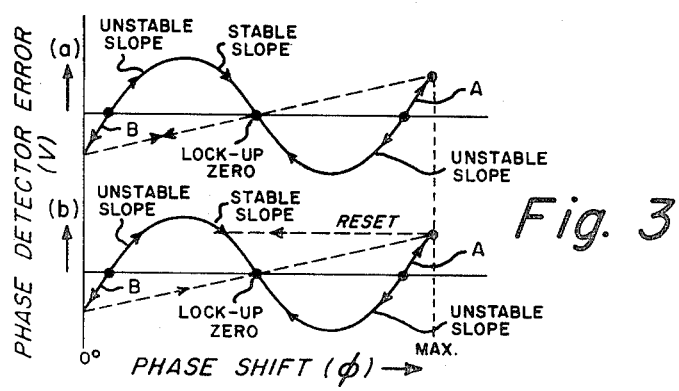
Fig. 3
INVENTORS
ERVIN SMITH
JOHN O. WEDEL
BY
Arthur L. Rollins
ATTORNEY

PHASE CONTROLLER

In many contemporary electronic systems a definite phase relationship must be established between two or more receiving or transmitting channels, for example, as between complementary channels of a typical monopulse receiver system. Many well known methods have been used to date to sample the phase difference between channels so that an adjustment may be made in one line or the other. Probably still the most widely used procedure is to manually measure the phase difference between the two lines before operation thereof and then physically placing a delay or phase shift element in the line. The disadvantage to this method is that it is done manually and only once at the beginning of operation and does not take into consideration that conditions may change in the lines over a period of time. In addition, electronically controlled phaser systems are also presently in use, the majority of which operate on the conventional phase lock loop theory. A phase lock loop system employs a phase shifting element, usually a voltage variable oscillator, which is capable of a 360° phase shift and which can traverse as many phase cycles as required to achieve lock up. However, the disadvantage to this is that it is impractical to hold the total phase shifting to 360° in a typical environment encountered by most operational systems. Also, if the total phase shift of the system is designed to be other than 360°, an additional problem is presented in that a limit cycle may result.

It is therefore an object of the present invention to provide a novel and improved mechanized phase controller having a finite phase shift adjustment which operates to prevent a limit cycle from being reached.

It is a further object of the present invention to provide a novel and improved digital phase controller for automatically adjusting and setting the phase between a pair of complementary channels.

It is another object of the present invention to provide a novel and improved two-channel phase controller which is continuously sampling the phase difference between the two channels under observation to equalize the phase therebetween and to insure that the channels are not 180° out of phase.

Other objects, advantages and novel features of the invention will become apparent from the following detailed description of the invention when considered in conjunction with the accompanying drawing wherein:

FIG. 1 of the drawing is a schematic block diagram showing a preferred embodiment of apparatus for carrying out the present invention;

FIG. 2 of the drawing is a circuit diagram of one preferred form of the phase controller logic circuitry represented in block form in FIG. 1; and FIG. 3 of the drawing illustrates a pair of waveforms which are helpful in understanding the operation of the circuit of FIG. 2.

Referring now to FIG. 1 of the drawing, a system for automatically adjusting the phase between a first and second channel 20 and 21, respectively, is shown. The system includes a switching mechanism 22, either mechanically or electrically operative, having a trio of normally open single-pole, double-throw switches 23—25 which, when in position $a$, allow normal operation of the channels 20 and 21. When the switches 23—25 are placed in position $b$, the associated control apparatus is operative to adjust the phase difference of the two channels, as will become more apparent hereinafter.

The output of the channels 20 and 21 are fed to the input of a phase detector 26, the channel 21 first passing through the phase controller logic circuit 27. The output error signal from the phase detector 26 is fed back into the phase controller 27 through the switch 25 when in test position $b$. Switching to test position $b$ also places a test signal from an oscillator 28 into each of the channels 20 and 21. The signal fed into the first channel is initially passed through a 90° phase shift element 29 to insure a balanced output from the phase detector 26, as is well known in the art.

Referring now in detail to the phase controller circuit 27 of FIG. 1, a plurality of fixed delay or phase shift networks 30 connected in series, such as coaxial cable, distributed components or any other type of suitable conventional delay elements, are provided to be selectively switched into the output signal path 21$a$ of the second channel to change the signal phase thereof until both channels 20 and 21 are in phase with each other, which will become more apparent hereinafter. A plurality of single-pole, double-throw switches 31 are connected serially with each other and in shunt arrangement with the individual delay networks 30 so that when the switches 31 are in their normally closed positions $a$, the delay networks 30 are bypassed and no additional phase shift is included in the second channel line.

The output from the phase detector 26 is connected to an analog-to-digital converter 32 which may be a conventional digital encoder, operable to convert an analog input to a digitized output indicative of the instantaneous voltage level of the phase detector. The output from the converter 32 is then fed through a pair of complementary clock pulse circuits, the up clock generator 33 and the down clock generator 34, which are connected to the up-down counter 35 in a parallel configuration to deliver bit timing pulses thereto, in a way well known in the art.

A plurality of switch actuators 36 are provided to open the normally closed switches 31 (position $b$) to individually place each of the delay networks 30 in series with the second channel 21. The switch actuators 36 are connected to the outputs of the up-down counter 35 and are individually operable to open or close a single switch 31 or a multiplicity of switches upon receiving a complementary bit count from said counter, the number of delay networks 30, switches 31 and switch actuators 36 being dependent on the number of stages utilized in the design of the counter 35. It is to be noted that the switch actuators 36 may employ any suitable conventional type of electrical or mechanical means to operate the switches 31, for example, such as an arrangement of relay actuated switches. An output signal 36$a$ from the switch actuators 36 are connected to the input terminals of an AND gate 37 whose output is fed back into the counter 35 and forms a reset-feedback loop, whose operation will become more apparent hereinafter.

This phase control system operates in the following manner. A test signal 28 at the operable channel frequency is injected into the channels to be phase compensated by closing the switches 23—25 when a phase difference is detected by the phase detector 26. If the channels 20 and 21 are not in phase, an error signal will be measured out of the phase detector 26 that is proportional to the phase difference between the channels. This phase error is used to control the phase controller logic circuit 27, shown in detail in FIG. 2. The phase detector 26 and the phase controller 27 form a closed loop system and a single one or a combination of the phase shifting elements 30 in the controller 27 will automatically be inserted into the second channel line until a null voltage is achieved by the phase detector 26. This method of phasing is similar to the operation of a phase locked loop. After the phase detector 26 has been nulled, the two channels 20 and 21 are in phase and the oscillator test signal 28 is removed and the channels are ready for operation.

The total delay of all of the fixed delay networks 30 is chosen to provide a delay of greater than $1/f_o$, where $f_o$ is the operational channel frequency. This delay ($\Phi$) is then greater than 1 cycle of the signal frequency, that is, greater than 360° phase shift. The fixed delay networks 30 are switched into the signal path of the second channel 21 when the up-down counter 35 counts a complementary bit. The counter 35 is controlled by the analog error signal from the phase detector 26 through the analog-to-digital converter 32 and the up-down clock generators 33 and 34.

If the operating frequency of the channels is selected to be $f_o$, the delay and phase shift of each delay section can be determined. Thus, the time delay required for a 360° phase shift is $1/f_o$, and the delay per bit, for an $n$-stage counter is found to be, $\Phi/360(f_o)(2a0n)$
and the phase change per bit is,
$\Phi/2^n$ For example, the following table illustrates the time delay and phase shift necessary for each of seven delay sections when employing a 7-stage counter 35, an operating frequency of 30 MHz. and a total phase shift of 405° is selected.

DELAY AND PHASE SHIFT

| Delay network | Delay (n sec.) | Phase shift (deg.) |
| --- | --- | --- |
| 1 | 0.29 | 3.16 |
| 2 | 0.58 | 6.32 |
| 3 | 1.17 | 12.65 |
| 4 | 2.34 | 25.31 |
| 5 | 4.69 | 50.62 |
| 6 | 9.37 | 101.25 |
| 7 | 18.75 | 202.50 |

It will be seen from the foregoing, for example, that if the error from the phase detector 26 causes the counter 35 to count to the ninth bit, the first and the fourth delay network is placed in the second channel line by the opening of their respective switches 31, providing a phase shift of approximately 28.47° therefore. The value of the phase shift for each succeeding delay network is increased by the ratio of $2^{N/1}$, where N is a whole number from 1 to $n$, corresponding to the inherent ratio existing in the stages of the up-down counter 35. Depending on the phase of the error signal from the phase detector, that is, a positive or negative signal, the corresponding signal from the analog-to-digital converter 32 will cause the up or down clock generator, 33 or 34, to deliver a timing pulse to the counter 35 causing it to either count up and add a greater phase shift to the second channel or count down and remove some of the phase shift already placed in the line.

A problem encountered in the design of the system is that only a finite phase shift ($\Phi$) is available and the possibility of the phase controller 27 reaching a limit cycle is thereby increased. Referring now to FIG. 3, the limit cycle referred to above is shown in graphical form in FIG. 3($a$), which is a plot of the phase shift of the controller 27 as a function of the error voltage from the detector 26. The arrows on the waveform show the direction that the phase controller 27, or any phase-locked loop, will traverse to lock up in phase. The difference between the present phase controller 27 and a conventional phase lock loop is that the phase shifting element of the controller is finite, whereas the phase shifting element of a phased lock loop can traverse as many phase cycles as required to achieve lock up.

In the present system, if the phase detector voltage should force the phase controller 27 to adjust to section A of FIG. 3($a$), for example, the phase shift will be increased by the stepping of the counter 35 in the direction shown by the arrow. After reaching the maximum count, which is $2^n-1$, the counter will normally recycle to a zero count such that the phase shift will drop to section B whereupon the phase detector error will force the phase shift back to section A. This phase shifting process will continue, resulting in the aforementioned limit cycle.

Since it is impractical to hold the total phase shifting to 360° so that the phase shift may always be advanced in the same direction, another approach is necessary to eliminate the limit cycle. The approach is easily explained with the aid of the graph of FIG. 3($b$). Assume that the error signal from the phase detector 26 has advanced the phase shift to section A. The phase will be stepped by the counter 35 in the direction shown by the arrow, as disclosed above in the explanation of FIG. 3($a$), until the counter 35 and phase shift are at maximum settings, that is, all of the plurality of switch actuators 36 have been operated to open the switches 31 and thereby place all of the delay networks 30 in series with the second channel line 21$a$. In this state, the AND gate 37 is receiving signals from each of the switch actuators 36 and, therefore, supplies a reset signal into the up-down counter 35. The counter 35 is designed, upon receipt of the signal from the AND gate 37, to automatically reset itself to a fixed count that will subtract the necessary number of bits from the maximum count to thereby subtract approximately 190° of phase shift from the second channel. For example, with the values chosen in the illustrative table, the counter would automatically subtract 60 bits from its maximum count. At this instance, the phase shift relationship will make a jump as shown in FIG. 3($b$) from the unstable slope A to the stable central slope of the waveform, allowing the phase controller 27 to eventually reach the stable zero point where it will lock up.

It will be noted that three zero phase detector error crossings are present in the waveforms shown in FIG. 3. One of the zeros is on a stable slope of the graph while the remaining two are on unstable slopes, although all three of the zeros are stable points. To insure that the phase controller 27 does not lock up on a zero crossing point having an unstable slope and thereby forcing the two channels to be 180° out of phase with each other, it is provided in the design of the system that the up and down clock generators, 33 and 34, are continuously running in sequence after a null voltage has been achieved by the phase detector 26, thus cycling the smallest increment of phase change ($\Phi$)/$2^n$ continuously in and out of the second channel. This sequential operation of the up and down clock generators will force the phase shift to cycle about the zero crossing upon which it has locked up. If the system happens to lock up on one of the zero crossings which is 180° out of phase, although this is admittedly a special case, the cycling of the counter 35 between two bits will force the phase detector error and phase shift relationship onto a part of the waveform having an unstable slope which will eventually result in the detector achieving the correct null position, as disclosed in the preceding paragraph.

Obviously many modifications and variations of the present invention are possible in the light of the above teachings. It is therefore to be understood that, within the scope of the appended claims, the invention may be practiced otherwise than as specifically described.

We claim:

1. In a system for automatically controlling the phase difference between a pair of operational channels, the combination comprising:
   a. means for applying a test signal into the two channels at the operating frequency thereof;
   b. a phase detector coupled to the output of the two channels to detect a phase difference therebetween and for generating a proportional output error signal;
   c. and a phase controller digital logic circuit coupled between the input of the phase detector and the output of one of the channels and responsive to the output error signal from said phase detector to adjust the phase of said one channel, thereby equalizing the phase difference between the two channels, said phase controller digital logic circuit comprising a time delay network having a plurality of fixed phase shift elements coupled between the output of the one channel and the input of the phase detector; an up-down digital counter; means coupled between the output of the phase detector and the up-down counter for producing a count in said up-down counter in response to the output error signal from said phase detector; and means responsive to the output count from the up-down counter to selectively switch the necessary number of phase shift elements in or out of the time delay network to equalize the phase between the two channels.

2. In a system substantially as described in claim 1 wherein the means for producing a count in the up-down counter includes:
   a. an analog-to-digital converter responsive to the output error signal from the phase detector for generating a digitized output indicative of the instantaneous voltage level of said phase detector;

b. and an up clock and a down clock generator coupled between the digitized output from the converter and the input of the counter in a parallel configuration, for generating timing pulses in response to said digitized output signal for producing an up or down count.

3. In a system substantially as described in claim 1 wherein the switch means includes:

a. a plurality of normally closed switches connected serially, each of said switches further connected in a shunt arrangement with an individual phase shift element;

b. and a plurality of switch actuators coupled between the output of the up-down counter and each of the switches to selectively open or close a multiplicity of said switches in response to a predetermined count from said counter, whereby the necessary phase shift is included in the one channel output to equalize the phase between the two channels.

4. In a system substantially as described in claim 3, where the phase controller digital logic circuit further comprises an AND gate coupled between the plurality of switch actuators and the up-down counter for resetting the counter to a predetermined count in response to the actuation of said plurality of switch actuators, whereby a multiplicity of the phase shift elements are shunted so that approximately 190° of phase shift is taken out of the one channel.

5. In a system substantially as described in claim 4 wherein:

a. The up-down counter comprises $n$ stages having a total count of $2^n-1$;

b. the time delay network comprises $n$ phase shift elements having a total combined phase shift greater than 360°, said $n$ phase shift elements having a phase shift distribution according to the formula $$2^{N \eta} (\Phi)/2$$

where $\Phi$ is the total combined phase shift and $N$ is a positive whole number from 1 to $n$;

c. and wherein the up and down clock generators are continuously running in sequence after an output null voltage has been achieved by the phase detector, thereby cycling the smallest increment of phase change in and out of the one channel to insure that a proper null position has been achieved.